(12) United States Patent  
Baum et al.

(10) Patent No.: US 10,502,634 B2  
(45) Date of Patent: Dec. 10, 2019

(54) TEMPERATURE MEASURING HEAD UNIT FOR A HOT STICK (71) Applicants: Kevin Lynn Baum, Rolling Meadows, IL (US); Lewis Allender Shaw, Hastings, MI (US)

(72) Inventors: Kevin Lynn Baum, Rolling Meadows, IL (US); Lewis Allender Shaw, Hastings, MI (US)

(73) Assignee: Hastings Fiber Glass Products, Inc., Hastings, MI (US)

( * ) Notice: Subject to any disclaimer, the term of this patent is extended or adjusted under 35 U.S.C. 154(b) by 144 days.

(21) Appl. No.: 15/584,511

(22) Filed: May 2, 2017

(65) Prior Publication Data  
US 2017/0314997 A1 Nov. 2, 2017

Related U.S. Application Data (60) Provisional application No. 62/330,486, filed on May 2, 2016.

(51) Int. Cl.  
*G01J 5/00* (2006.01)  
*G01K 1/02* (2006.01)  
*G01K 1/14* (2006.01)  
*G01D 11/30* (2006.01)  
*H02G 1/02* (2006.01)  
*G01J 5/08* (2006.01)  
*G01J 5/02* (2006.01)  
*G01J 5/04* (2006.01)

(52) U.S. Cl.  
CPC ............ *G01K 1/024* (2013.01); *G01D 11/30* (2013.01); *G01J 5/025* (2013.01); *G01J 5/028* (2013.01); *G01J 5/0275* (2013.01); *G01J 5/047* (2013.01); *G01J 5/089* (2013.01); *G01J 5/0859* (2013.01); *G01K 1/143* (2013.01); *H02G 1/02* (2013.01)

(58) Field of Classification Search  
CPC .... G01J 5/02; G01J 5/089; G01J 5/026; G01J 5/025  
USPC ............... 374/120, 121, 152, 163, 183, 208; 340/870.17  
See application file for complete search history.

(56) References Cited

U.S. PATENT DOCUMENTS

| | | | | |
|---|---|---|---|---|
| 4,384,289 A | * | 5/1983 | Stillwell ............... | G01K 1/024 324/126 |
| 4,658,509 A | * | 4/1987 | Juengel .................. | G01B 7/012 33/558 |
| 4,904,996 A | * | 2/1990 | Fernandes ............ | G01R 15/142 340/601 |
| 5,727,880 A | * | 3/1998 | Hollander ................. | G01J 5/02 33/DIG. 21 |
| 5,836,694 A | * | 11/1998 | Nguyen .................... | G01J 5/08 374/130 |
| 6,095,682 A | * | 8/2000 | Hollander .............. | G01D 21/02 374/121 |

(Continued)

FOREIGN PATENT DOCUMENTS

CA 1243355 A * 10/1988 ........... B23Q 1/0009

Primary Examiner — Gail Kaplan Verbitsky  
(74) Attorney, Agent, or Firm — Flynn Thiel, P.C.

(57) ABSTRACT

A temperature sensing system including a head unit comprising a thermal sensor for acquiring thermal data from a surface, a wireless transmitter wirelessly transmitting the thermal data, and a mounting interface; and a non-conductive pole connected to the mounting interface of the head unit.

32 Claims, 10 Drawing Sheets

(56) References Cited

U.S. PATENT DOCUMENTS

| | | | |
|---|---|---|---|
| 7,001,065 B2* | 2/2006 | Dishaw | E21B 19/165 374/121 |
| 7,019,638 B1* | 3/2006 | Wallace | G01K 1/024 340/531 |
| 7,192,186 B2* | 3/2007 | Blakeley, III | G01J 5/041 374/120 |
| 8,657,490 B2* | 2/2014 | Sibilant | G01J 5/02 374/121 |
| 8,822,922 B1* | 9/2014 | Scanlon | G01J 5/02 250/330 |
| 9,632,199 B2* | 4/2017 | Olsson | G01V 3/15 |
| 9,924,419 B2* | 3/2018 | Moon | H04W 76/18 |
| 9,973,947 B2* | 5/2018 | Iwanaga | G06T 7/11 |
| 10,047,899 B2* | 8/2018 | Guest | F16M 11/32 |
| 2005/0089078 A1* | 4/2005 | Hollander | G01J 5/02 374/121 |
| 2008/0144696 A1* | 6/2008 | Bruggeman | F24H 9/2071 374/121 |
| 2009/0184244 A1* | 7/2009 | Drews | A62B 3/00 250/330 |
| 2011/0178758 A1* | 7/2011 | Atwell | G01B 5/012 702/134 |
| 2013/0163132 A1* | 6/2013 | Schweitzer, III | H02H 7/263 361/62 |
| 2013/0208761 A1* | 8/2013 | Mavrides | G01J 5/089 374/121 |
| 2013/0342691 A1* | 12/2013 | Lewis | H04N 5/332 348/143 |
| 2014/0269466 A1* | 9/2014 | Owens | H04W 52/0206 370/311 |
| 2015/0054641 A1* | 2/2015 | Petrucelli | B60C 23/006 340/447 |
| 2015/0341532 A1* | 11/2015 | Terre | G08B 13/1963 348/376 |
| 2015/0374161 A1* | 12/2015 | Bilet | A47J 27/16 99/330 |
| 2016/0161420 A1* | 6/2016 | Zhu | G01N 27/041 374/44 |
| 2016/0223588 A1* | 8/2016 | Fox | G01J 5/0896 |
| 2016/0344170 A1* | 11/2016 | Tamm | H02G 1/005 |
| 2017/0030516 A1* | 2/2017 | Kinner | F16N 7/32 |
| 2017/0107090 A1* | 4/2017 | Mondal | B66F 17/006 |
| 2018/0157250 A1* | 6/2018 | Barnickel | H04B 7/18506 |
| 2018/0354375 A1* | 12/2018 | Dao | B60L 11/1816 |

* cited by examiner

TEMPERATURE MEASURING HEAD UNIT FOR A HOT STICK

CROSS-REFERENCE TO RELATED APPLICATIONS

This claims the benefit of U.S. Provisional Application No. 62/330,486, filed May 2, 2016, the disclosure of which is hereby incorporated by reference in its entirety.

BACKGROUND OF THE INVENTION

Many devices exist for measuring temperature. Some measure the ambient temperature, others measure the temperature of an object by making physical contact with it, and some can perform non-contact temperature measurements. For example, there are handheld non-contact measurement devices that take a measurement when a person holding the device activates a momentary-contact switch on the device. Upon activation of the switch, a measured temperature value is displayed directly on the measurement device. However, these handheld measurement devices are not readily usable in situations where the user cannot be in reasonable physical proximity to the object to be measured, or when being in physical proximity would put the user at risk of physical harm. What is needed is a new measurement system/device that will be more suited to the described situations.

DETAILED DESCRIPTION

Figure 1:
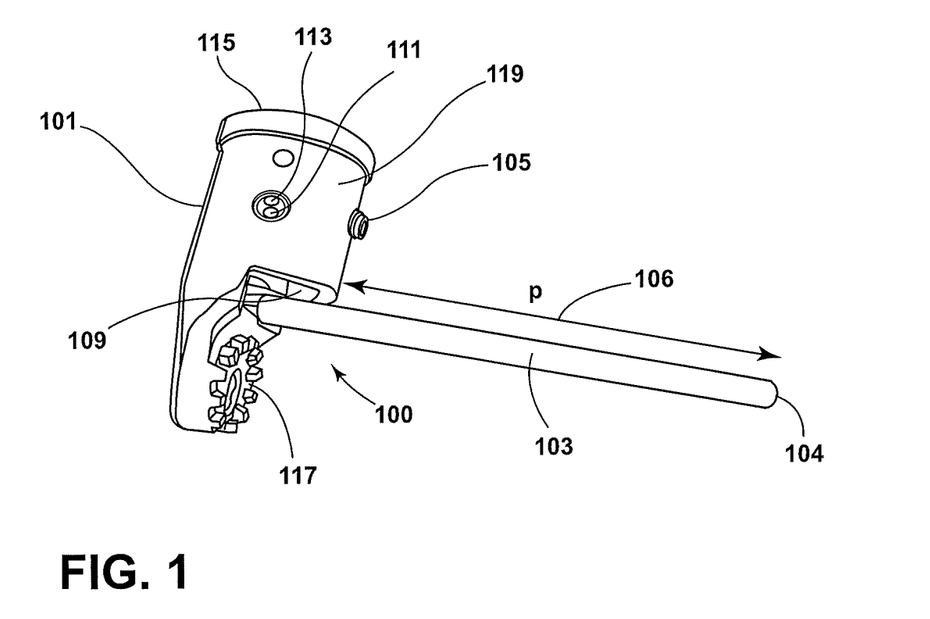
FIG. 1 shows an exemplary head unit.

FIG. 1 shows an embodiment of a head unit 100 in accordance with the present invention. Head unit 100 has an enclosure 101, a direction pointing protrusion 103, a directional non-contact thermal sensor 105, a power switch 111, a status indicator 113, a cap 115, a mounting interface 117, and circuitry 119 (not visible due to the opaque construction of enclosure 101) comprising a wireless transmitter and other circuitry. The circuitry may further comprise a battery level monitor. The directional non-contact thermal sensor 105 acquires thermal data by way of non-contact sensing of thermal characteristics of an object, without physical contact between the object and the thermal sensor 105, by pointing a directional FOV (field-of-view) of the sensor 105 towards the object at a distance from the object.

Figure 2:
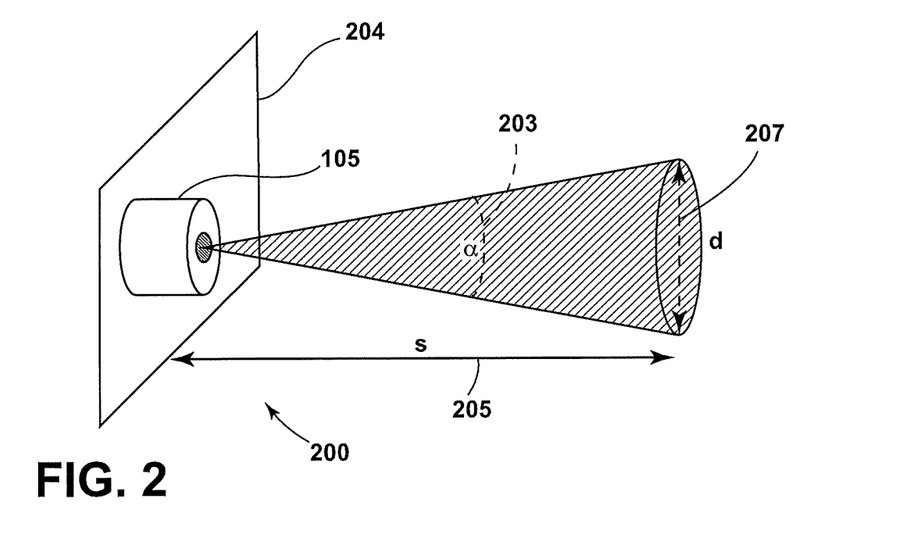
FIG. 2 shows a thermal sensor characteristic of the head unit of FIG. 1.

In some embodiments, thermal sensor 105, as shown in FIG. 2, has a cone-shaped field of view (FOV) characterized by an angle $\alpha$ 203, or by a diameter d at a distance s, or by a width or a height at a distance s. In FIG. 2, the FOV points perpendicularly to an orientation plane 204 of the thermal sensor 105. In FIG. 2, orientation plane 204 intersects a point of origin of the FOV of the thermal sensor 105. For the purpose of illustration, consider that the sensor 105 is pointed perpendicularly at an infinitely large flat wall, at a distance s 205 from the wall. Then sensor 105 can sense over a circular portion of the wall surface denoted by the base of the cone in FIG. 2 having a diameter d 207. The diameter d will be related to the distance s and FOV $\alpha$ by $d=2s*\tan(\alpha/2)$, and the circle of diameter d can also be referred to as a "spot beam". If thermal sensor 105 is pointed at an object, and the surface of the object extends beyond the spot beam, then the thermal characteristics of the portion of the surface within the spot beam can be sensed. On the other hand, if the surface of the object is smaller than the spot beam, sensor 105 will sense a combination of the object surface and anything else that is within the FOV but beyond the object's surface.

In some embodiments, the thermal characteristic sensed by sensor 105 is an infrared radiation emitted by the object. In some embodiments, sensor 105 and/or circuitry 119 in head unit 100 provide a representation of the thermal characteristic as a temperature value. Thermal data from sensor 105 is processed and wirelessly transmitted by the wireless transmitter. In some embodiments, a current temperature value is obtained periodically and is wirelessly transmitted.

If used near electrical power lines, head unit 100 may be exposed to strong, very low-frequency (VLF) (50~60 Hz) electric fields. In some embodiments, enclosure 101 comprises materials or coatings to shield the circuitry inside enclosure 101 from such strong, low-frequency electric fields. However, at least a portion of such shielding is configured to at least partially pass higher frequency electromagnetic signals in a frequency band used for wireless transmissions by head unit 100. In FIG. 1, enclosure 101 is constructed of metal and an opening 109 is provided near an antenna of the wireless transmitter in the enclosure.

Direction pointing protrusion 103 provides a visual reference for indicating a characteristic of an orientation of the FOV of sensor 105. In FIG. 1, direction pointing protrusion 103 is aligned with sensor 105 in an azimuthal sense, such that the tip 104 of protrusion 103 is approximately centered in an azimuthal dimension of the FOV of the sensor 105. This enables a person operating the head unit 100 from a distance to accurately point the FOV of the sensor 105 towards an object and measure its thermal characteristics, such as temperature.

Direction pointing protrusion 103 may have a specific length such that the FOV of sensor 105 has a known size near the tip 104 of protrusion 103. As an example, consider the sensor 105 of FIG. 2 with $\alpha$ having a value of 10 degrees. In order to provide a spot beam of approximately 1 inch diameter near the tip of the protrusion 103, the length of protrusion 103 is selected such that it extends approximately $p=1/(2*\tan_{deg}(10/2))=5.7$ inches beyond the plane of the sensor 105, as shown by distance arrow p 106. In this example, $\tan_{deg}(x)$ means tangent of x, where x is specified in degrees. In addition, the base of protrusion 103 may be positioned on enclosure 101 (such as at a particular distance from sensor 105 and/or particular elevation angle) such that the tip 104 of protrusion 103 provides a visual reference for locating an edge of the FOV of sensor 105. Continuing with the example of this paragraph, if protrusion 103 is located 0.5 inches below sensor 105 and they are otherwise aligned, then the tip 104 of protrusion 103 will approximately coincide with the bottom edge of the 1 inch diameter spot beam. Or, if protrusion 103 is located 1.5 inches below sensor 105 and they are otherwise aligned, then the bottom edge of the 1 inch diameter spot beam will be approximately 1 inch above the tip 104 of protrusion 103. In some embodiments, the value of the spot beam diameter near the tip of the protrusion 103 is displayed on head unit 100 (e.g, by printing/labeling/etching/display screen, etc.). In one embodiment, the distance between the tip of the protrusion 103 and the edge of the spot beam is displayed on head unit 100.

Direction pointing protrusion 103 may be constructed to provide additional utility. It may be constructed of a non-conductive material in order to protect enclosure 101 and its internal circuitry from direct electrical contact with a high-voltage object in the FOV of the sensor 105. It may be constructed of sturdy materials in order to provide a "propping" or "stabilizing" support. For example, if head unit 100 is mounted to the top of an extended telescopic pole, a person holding the pole may be able to rest the tip 104 of protrusion 103 against a surface being sensed by sensor 105 in order to reduce unintended head movement and reduce operator fatigue. Thus, it is preferable that protrusion 103 and head unit 100 be constructed to support the mechanical force resulting from resting the tip of protrusion 103 against an object when head unit 100 is attached to an extended hot-stick that is in a non-vertical orientation.

Circuitry 119 may comprise battery monitoring circuitry, for measuring/providing a battery level of the head unit 100. The transmitter may transmit a value of the battery level. This enables monitoring of the battery level of the head unit 100 (such as remaining battery charge status, etc.) at a distance from the head unit 100. Circuitry 119 may further comprise automatic function disabling circuitry, for disabling one or more components of head unit 100 (e.g., the wireless transmitter, the thermal sensor 105, or several components such that the head unit 100 is placed into a powered-off state, etc.) when the battery level of the head unit 100 is below a threshold value. This can help prevent operational malfunction of the head unit 100 when the batteries become too depleted for reliable operation.

Power switch 111 turns the head unit 100 power on or off. In some embodiments, enclosure 101 has a countersunk opening for power switch 111 such that the switch 111 does not protrude significantly from enclosure 101, to prevent accidental breakage or accidental activation of the switch 111.

Status indicator 113 provides a visual indication of an operational state of head unit 100. In some embodiments, status indicator 113 indicates at least some of the following states: powered on but not paired with a receiver, powered on and paired with a receiver, transitioning to a powered off state, powered off. These may be signified, for example, with an LED whose light on/off status, blink rate, blink duty cycle, etc. can be uniquely linked to each state.

In some embodiments, power switch 111 and status indicator 113 are integrated in a single module to provide a combination of their functionality requiring only one opening in enclosure 101.

Cap 115 can be removed in order replace internal batteries of head unit 100 that provide its electrical power.

Mounting interface 117 may be used to mount head unit 100 to another object. In some embodiments, mounting interface 117 is configured to mount to a hot-stick universal head, such as the universal head sold by Hastings Fiber Glass Products, Inc. as Model #3116.

Figure 3:
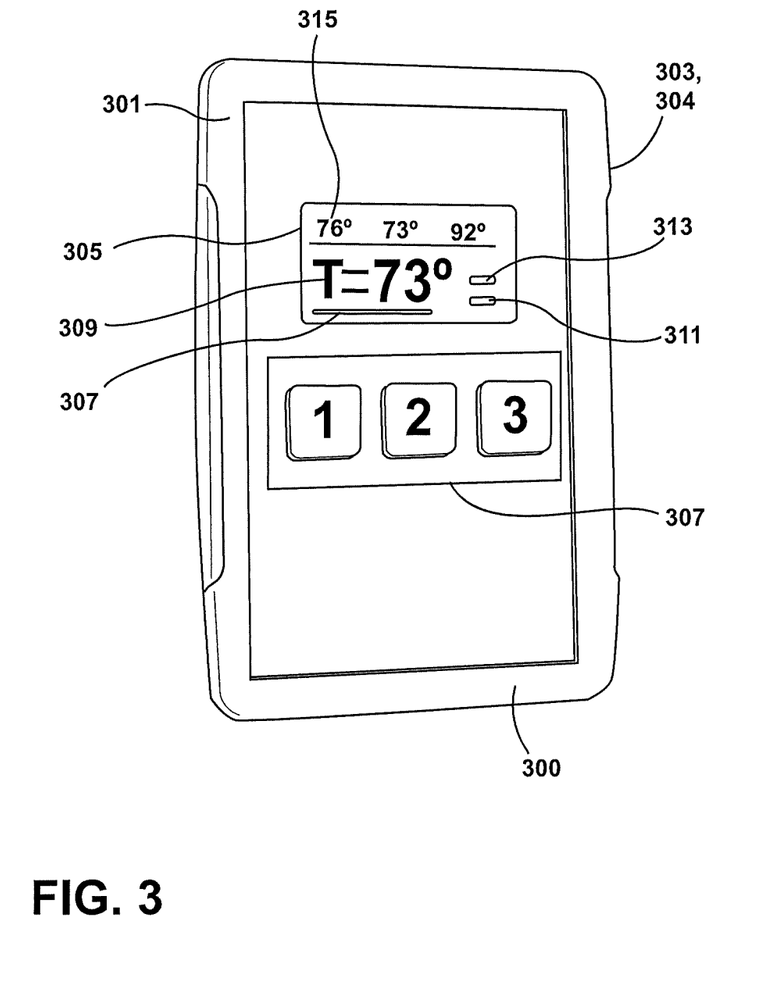
FIG. 3 shows an exemplary remote unit.

FIG. 3 shows an embodiment of a remote unit 300 in accordance with the present invention. The remote unit 300 comprises a case 301, wireless receiver 303 (inside the case), circuitry 304 (inside the case), a display module 305, and function buttons 307. Wireless receiver 303 receives thermal data from head unit 100 and displays information related to the thermal data on display 305. In some embodiments, the information is a temperature value 309.

Wireless receiver 303 may receive battery level information from head unit 100 and display the received head unit battery level information 311 on display 305. This enables an operator to monitor the battery level of the head unit 100 without the need for a battery level display on the head unit 100. Remote unit 300 may be powered by internal batteries, and may monitor its own battery level with circuitry 304 and display its battery level 313 on display 305.

Remote unit 300 may monitor received head unit battery information for a head unit low battery condition. If received head unit battery information indicates that the head unit battery level is below a threshold value, remote unit 300 may disable display of the temperature value 309 and instead display an error message on display 305. An example error message is "Replace transmitter batteries".

Remote unit 300 may receive thermal data from head unit 100 periodically, and refresh displayed temperature value 309. In order to store temperature values of interest to an operator, a memory function may be provided by remote unit 300. In some embodiments, pressing and holding one of the function buttons 307 causes remote unit 300 to store the current temperature value and display it on a different part of the screen 315. FIG. 3 illustrates three stored temperature values along the upper part of the display 305 corresponding to the three function buttons 307 labeled "1", "2" and "3".

Function buttons 307 may provide additional functions for remote unit 300, such as power-on, power-off, etc., when multiple buttons are pressed simultaneously and/or pressed continuously for a period of time.

Remote unit 300 may determine and monitor a received signal quality for signals received from head unit 100 by wireless receiver 303. Signal quality may be any wireless signal quality measure known in the art (e.g., received signal strength, SNR, SINR, SIR, data error rate, etc.). Remote unit 300 may display the received signal quality on display 305. In some embodiments, the signal quality is displayed as a horizontal bar 317 having a longer length for higher signal quality and a shorter length for lower signal quality. In some embodiments, an error message may be displayed on display module 305 when the signal quality is below a predetermined threshold value.

Figure 4:
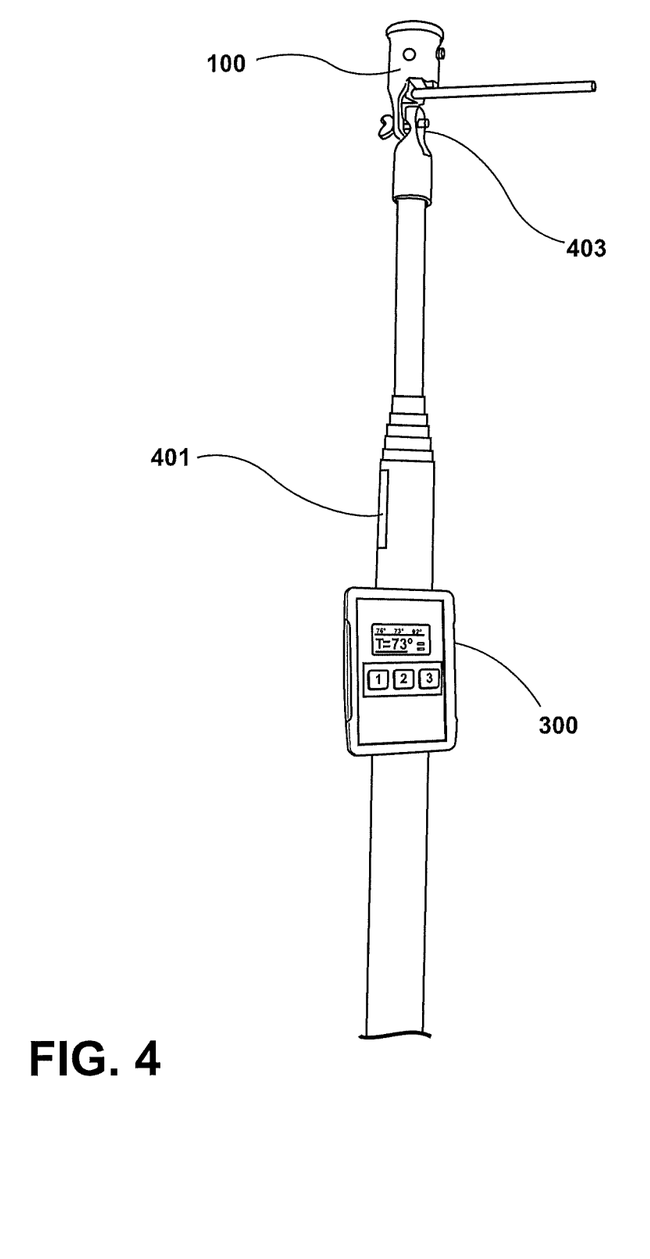
FIG. 4 shows a head unit and a remote unit mounted to a telescopic hot-stick.

FIG. 4 shows a head unit 100 and a remote unit 300 mounted to a telescopic hot-stick 401. Hot-stick 401 has a universal head mount 403 to which the head unit 100 is attached. Head unit 100 and remote unit 300 may be battery operated. An operator may turn on both the head unit 100 and the remote unit 300. If the head unit 100 and remote unit 300 have not been paired for wireless communication, they may be paired based on operator input to one or both units. Alternatively, the units may be configured to automatically search for nearby pairable devices and either pair automatically or provide a prompt to the operator that, if confirmed by operator input, will result in a pairing operation being completed. Hot-stick 401 can be extended by an operator towards an object, such as a transformer, in order to measure the object's surface temperature, even though the sensor 105 is not in physical contact with the object and even though the operator is not in physical proximity to the object.

Head unit 100 may repeatedly measure and transmit temperature values over time without user input/interaction, so that the operator can conveniently view changes in the measured temperature on remote unit 300 as head unit 100 changes position or points toward different surfaces. As the head unit 100 approaches the surface to be measured, the operator may use the direction pointing protrusion of the head unit 100 to point the FOV of the sensor 105 directly towards the surface. Also, when the operator wants to measure a small portion of the surface, such as a 2 inch diameter spot, he may use the direction pointing protrusion as a visual distance estimating aid, in order to position the head unit 100 at an appropriate distance from the surface. Moreover, the operator may use the direction pointing protrusion as a propping support for the extended hot-stick 401, by resting its tip against the surface to be measured. This prevents the head unit 100 from moving, wobbling, or becoming misaimed during temperature measurements, and also reduces operator fatigue. When using the direction pointing protrusion as a propping support, the sensor 105 will also be placed at a consistent and known distance from the surface, and the size of the measurement spot beam will more consistent as a result.

It is contemplated that the remote unit 300 can be mounted or clipped to the base section of hot-stick 401 while in use, to provide a stable and easily readable temperature display without handling the remote unit 300. Remote unit 300 may have a temperature memory function for storing multiple measured temperature values. For example, an operator may record the temperature of 2 different objects. The operator may point the head unit 100 towards the first object and press a button to store and display a first temperature value on a first part of the screen of remote unit 300. The operator may then point the head unit 100 towards the second object and press a button to store and display a second temperature value on a second part of the screen of remote unit 300. Alternatively, temperature data received by remote unit 300 may be stored over time for later retrieval and processing. Remote unit 300 may have a peak hold mode for displaying the maximum temperature value it has received from head unit 100. The peak value may be reset/cleared of its history by operator input, such as pressing a button or power cycling remote unit 300.

Figure 5:
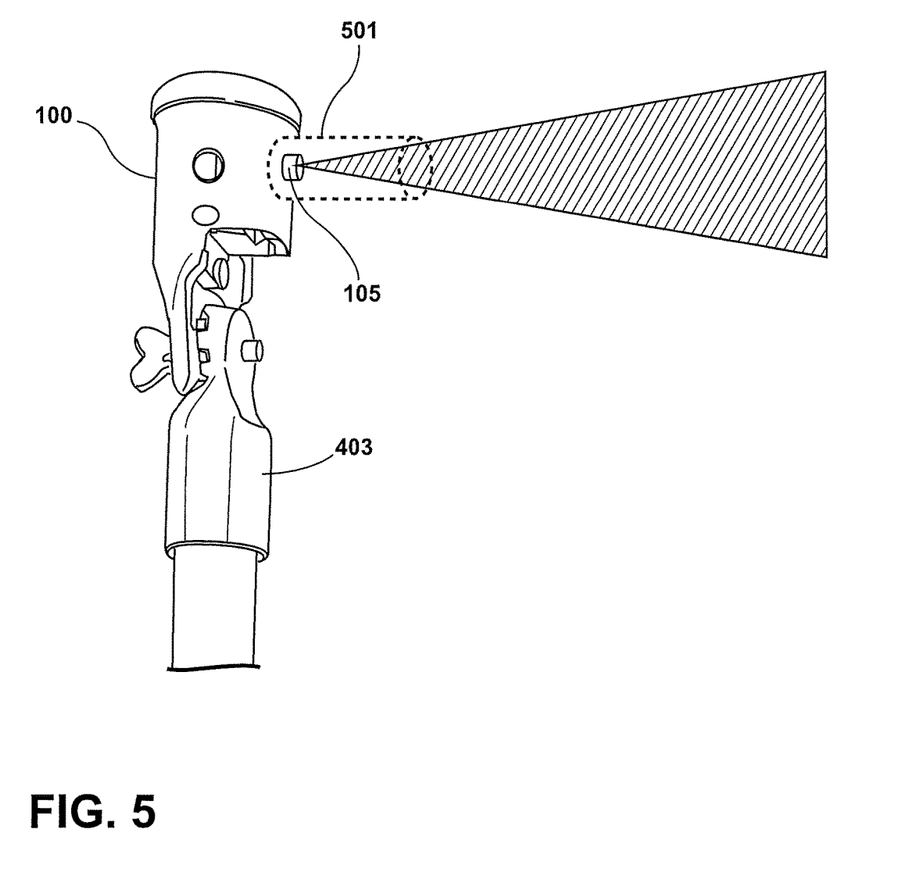
FIG. 5 shows a head unit with a cylindrical direction pointing protrusion.

FIG. 5 shows an additional embodiment of a direction pointing protrusion 501 on a head unit 100. In this embodiment, the protrusion 501 is a hollow cylinder preferably mounted coaxially with the thermal sensor 105. The outline of the cylinder is shown with dashed lines and the cylinder is drawn as a transparent cylinder for ease of illustration. The diagonally shaded cone emerging from sensor 105 illustrates a vertical slice of the FOV of sensor 105. As shown in FIG. 5, it is preferable that the diameter and/or length of protrusion 501 be configured such that the interior surface of the protrusion does not interfere with the FOV of sensor 105. The coaxially mounted direction pointing protrusion may be a complete cylinder or just a segment of a cylinder (e.g., a half cylinder, etc.), or some other shape. For example, a half-cylinder may be mounted above the sensor 105 to reduce sunlight on the sensor 105, and to shield the sensor 105 from falling rain drops.

Figure 6:
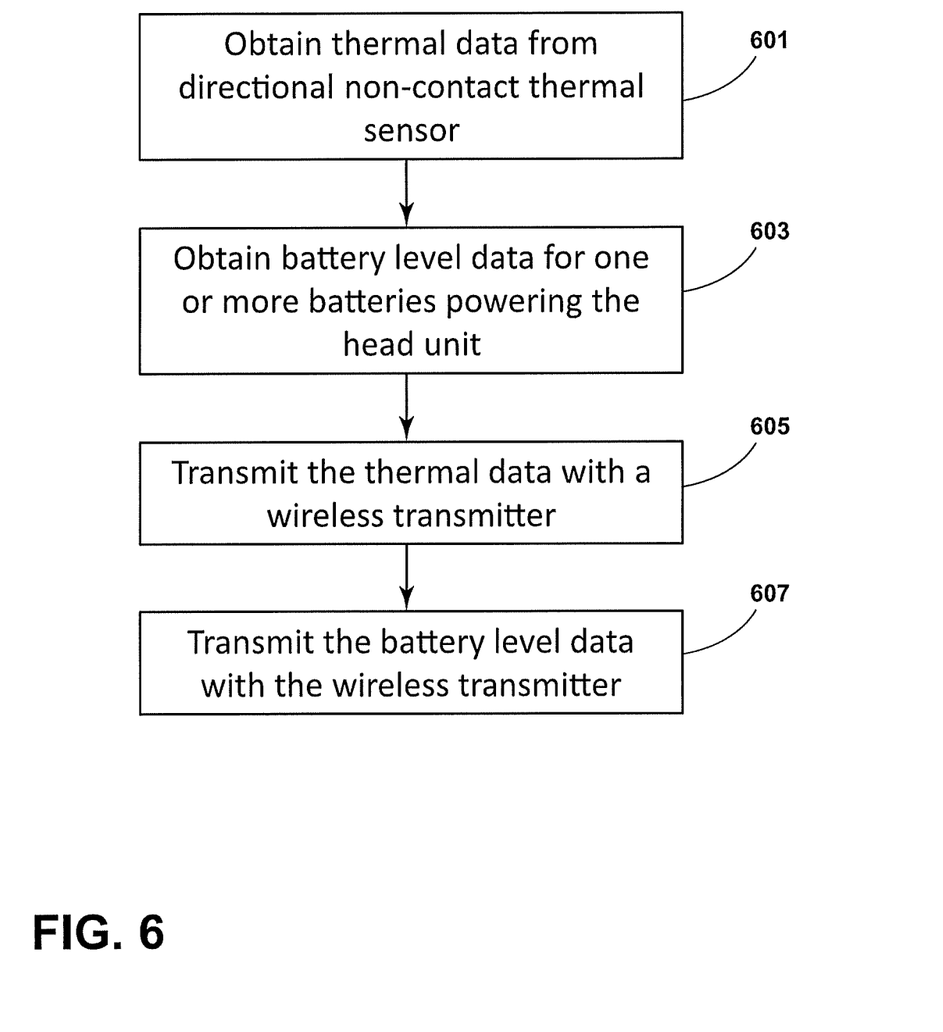
FIG. 6 shows a flowchart of a method of using a head unit.

FIG. 6 shows a flowchart of a method of operation of the head unit 100. The method comprises obtaining thermal data from the directional non-contact thermal sensor (e.g., temperature data, etc.) at 601, obtaining battery level data for one or more batteries powering the head unit 100 (e.g., for a single battery powering the head unit 100 or a combination of batteries forming a battery pack) at step 603, transmitting the thermal data with a wireless transmitter at step 605, and transmitting the battery level data with the wireless transmitter at step 607. A remote unit may receive and display the data transmitted by the head unit 100. The method of FIG. 6 or portions thereof (e.g., operations 601 and 605) may be automatically repeated periodically over time, in order to provide continuously updated thermal and/or battery level data. In some embodiments, the method may further comprise determining an operational state of the head unit 100, and displaying the determined operational state with a visual indicator on the head unit 100. Examples of an operational state that may be displayed are at least one of: powered on but not paired with a receiver, powered on and paired with a receiver, transitioning to a powered off state, powered off, etc. In some embodiments, the method may further comprise automatically, disabling one or more components of the head unit when the battery level of the head unit is below a threshold value (e.g., automatically disabling the wireless transmitter of the head unit when the battery level is below a threshold value; automatically disabling the directional non-contact thermal sensor of the head unit when the battery level is below a threshold value; or automatically placing the head unit into a powered-off state when the battery level is below a threshold value, etc.). It is contemplated that the steps 601, 603, 605 and 607 could occur in any order or simultaneously. Furthermore, it is contemplated that only some of the steps 601, 603, 605 and 607 could occur during use of the head unit 100.

Figure 7:
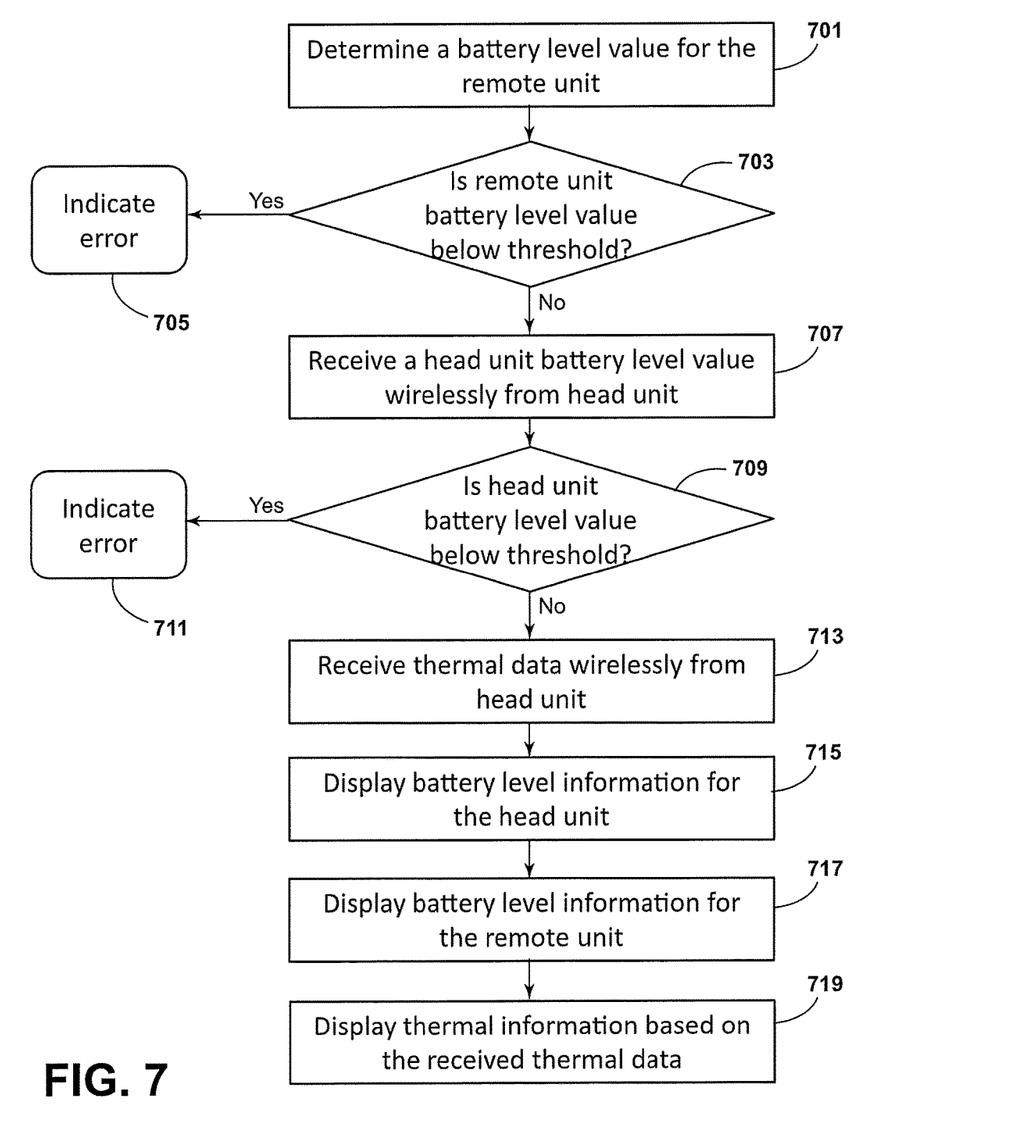
FIG. 7 shows a flowchart of a method of using a remote unit.

FIG. 7 shows a flowchart of a method of operation of the remote unit 300. The method comprises determining a battery level value for the remote unit at step 701, and determining whether the remote unit 300 has a low-battery condition by checking whether its battery level is below a threshold value at step 703. If the battery level is below the threshold value as determined at step 703, an operational error condition is indicated (e.g., display an error message, display a message to replace the remote unit batteries, cease display of other information, blank a display, etc.) at step 705. If the battery level is not below the threshold value as determined at step 703, the method further includes receiving a head unit battery level value wirelessly from head unit at step 707, and determining whether the head unit at step 707 has a low-battery condition by checking whether its battery level is below a threshold value at step 709. If the battery level is below the threshold value as determined at step 709, an operational error condition is indicated at step 711 (e.g., display an error message, display a message to replace the head unit batteries, cease display of other information, blank a display, etc.). If the battery level is not below the threshold value as determined at step 703, the method proceeds to receiving thermal data wirelessly from the head unit at step 713, displaying battery level information for the head unit at step 715 (e.g., as a number, as a percentage, as a graphical shape such as a battery fuel gauge like shown in FIG. 3 311, etc.), displaying battery level information for the remote unit itself at step 717, and displaying thermal information (e.g., a temperature value, etc.) based on the received thermal data at step 719. It is contemplated that the steps 703 and 709 could occur in any order or simultaneously. It is also contemplated that the steps 713, 715, 717 and 719 could occur in any order or simultaneously. Furthermore, it is contemplated that only some of the steps 701, 703, 705, 707, 709, 711 713, 715, 717 and 719 could occur during use of the remote unit 300.

In some embodiments the method of FIG. 7 may be automatically repeated periodically over time. In some embodiments the method of FIG. 7 may further comprise one or more of: displaying a warning message when a wireless connection between the head unit and the remote unit is lost, displaying received signal quality information for wireless signals received from the head unit, storing and displaying a maximum value based on the received thermal data, storing and displaying a value based on the received thermal data at a particular point in time, wherein the point in time is based on a point in time when a user interacts with the remote unit.

Figure 8:
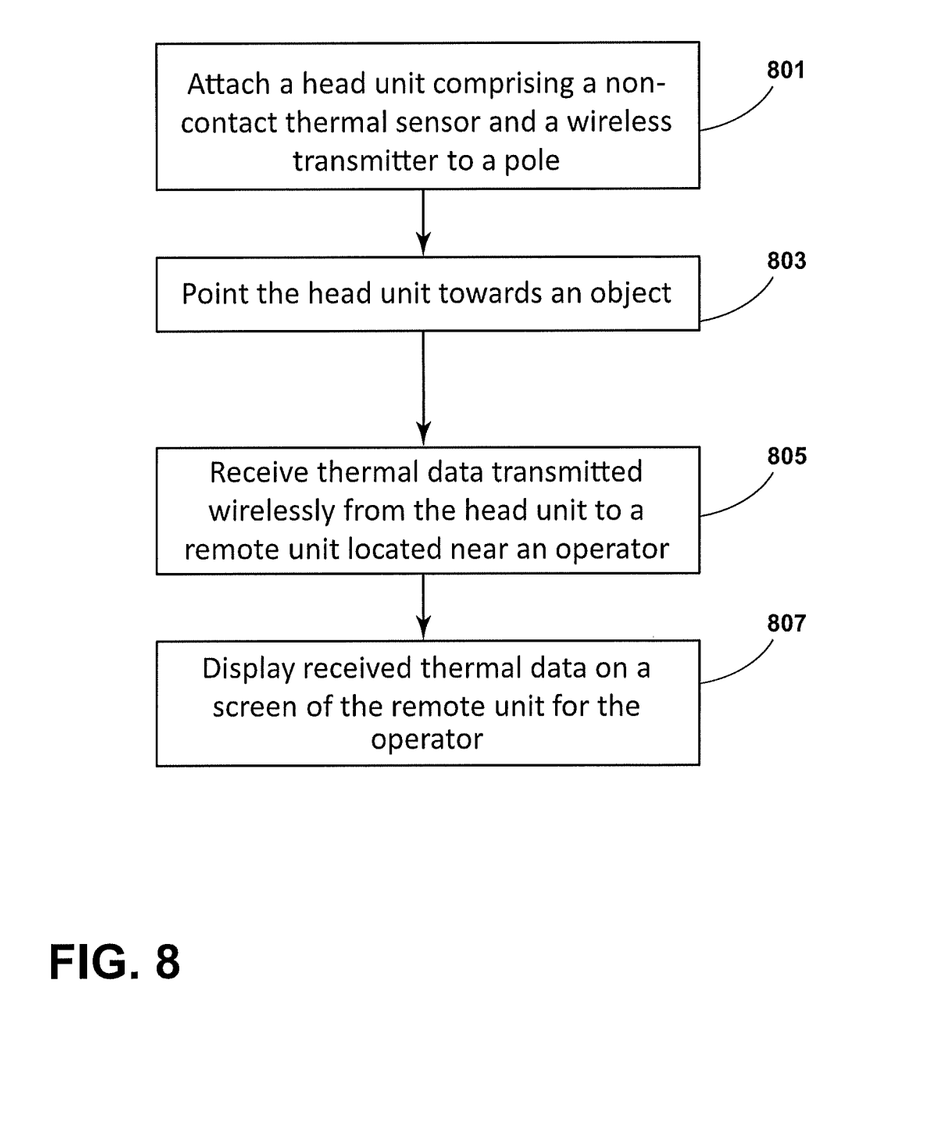
FIG. 8 shows a flowchart of an operational method.

FIG. 8 shows a flowchart of an operational method of the invention. The method comprises attaching a head unit comprising a non-contact thermal sensor and a wireless transmitter to a pole at step 801, pointing the head unit towards an object at step 803 (e.g., in order to assess a surface temperature of the object), receive thermal data transmitted wirelessly from the head unit to a remote unit located near an operator at step 805, and displaying received thermal data on a screen of the remote unit for the operator at step 807. In some embodiments, the pole may be a hot-stick. In some embodiments, the pole may be an extendable pole, and the method may further comprise extending the pole in order to position the head unit near the object. In some embodiments, attaching a head unit to a pole comprises attaching the head unit to a universal hot-stick mounting head on the pole. In some embodiments, the head unit is located at a greater-than-arms-length distance from an operator of the head unit when pointing the head unit towards an object.

Wireless transmissions of head unit 100 may utilize any suitable wireless protocol. For example: any proprietary wireless protocol, any Bluetooth®-based protocol, any WiFi®-based protocol, any Zigbee®-based protocol, any Z-Wave®-based protocol, etc.

In some embodiments, thermal sensor 105 may have a differently shaped FOV. In some embodiments, thermal sensor 105 may have an array of sensors and thermal sensor 105 may provide an array of sensed values within a FOV of the sensor 105. Such an array of sensed values may be used to provide a thermal "picture" or "image" of a surface within the FOV of the sensor 105.

In some embodiments, direction pointing protrusion 103 may be augmented or replaced with a different visual pointing aid such as a laser pointer.

In some embodiments, head unit 100 may include a camera module. The camera module can be mounted in or on enclosure 101 in close proximity to thermal sensor 105. The camera module can be mounted with an alignment to thermal sensor 105 such that a FOV of the camera and the FOV of thermal sensor 105 are at least partially overlapping, and such that the camera module does not physically interfere with the FOV of the thermal sensor 105. The camera FOV and thermal sensor FOV may have different angles and/or shapes, but it is contemplated that the centers of their FOV's can be as close together as practically possible. Circuitry in head unit 100 may transmit image data from the camera module in addition to thermal data. Remote unit 300 may receive the image data and display it on a display screen in order to provide visual feedback to assist an operator in positioning/pointing the head unit 100 at a surface of interest. Remote unit 300 may combine received image and thermal data and display the combined information on a display screen.

In some embodiments, bi-directional wireless communication may occur between head unit 100 and remote unit 300. In this, case head unit 100 and remote unit 300 will include both wireless transmitters and wireless receivers. In other words, both will have wireless transceivers. Bidirectional communications may provide additional benefits, such as error reporting and retransmission of corrupted or missed data. Head unit 100 and remote unit 300 may also exchange information to provide identification and pairing of a specific model and/or identification number head unit with a remote unit having a specific model/identification number.

In some embodiments, head unit 100 may wirelessly transmit thermal data to a different type of remote unit, such as a smartphone, using a compatible wireless protocol such as Bluetooth Low Energy, WiFi, etc. Battery level information may also be transmitted to the different type of remote unit. The different type of remote unit may display the temperature or battery level information received from the head unit 100.

Figure 9:
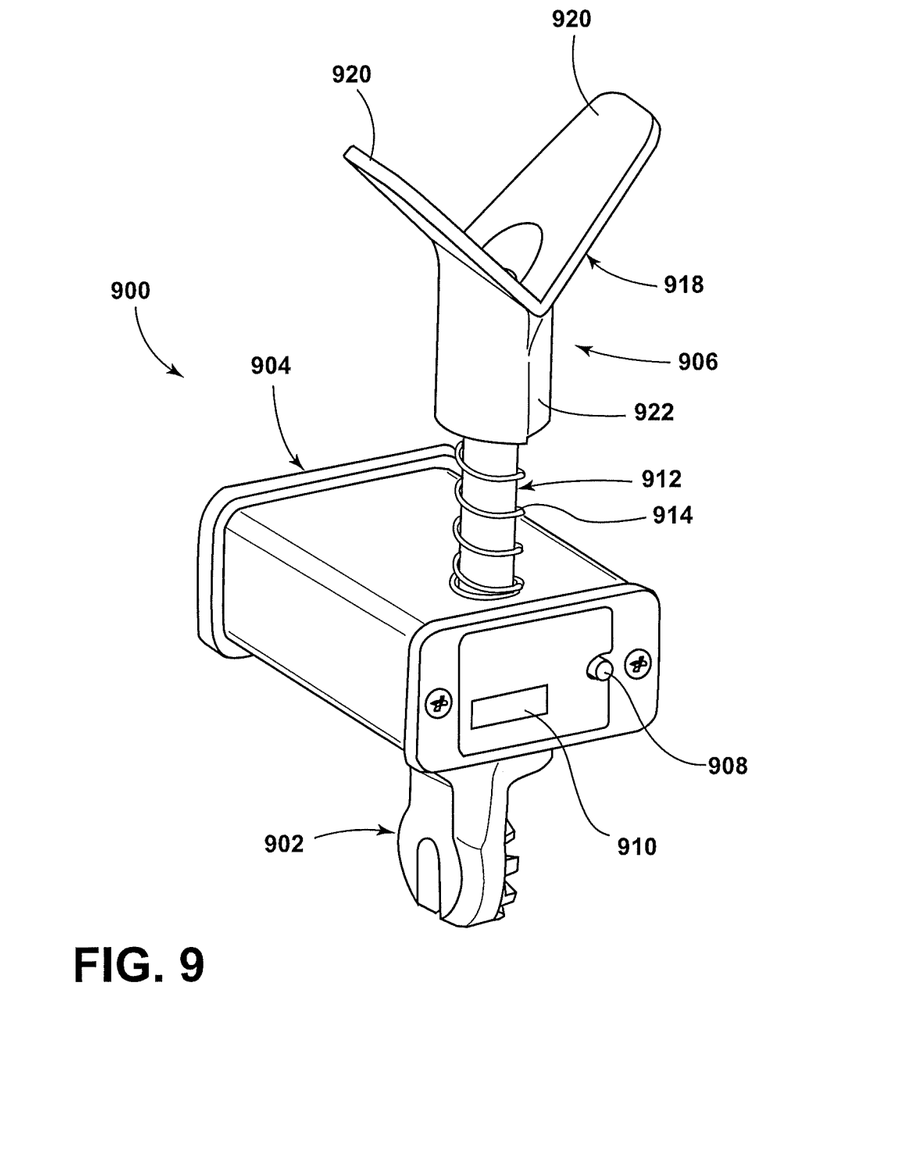
FIG. 9 shows a perspective view of a contacting temperature measuring device in an initial position.
Figure 10:
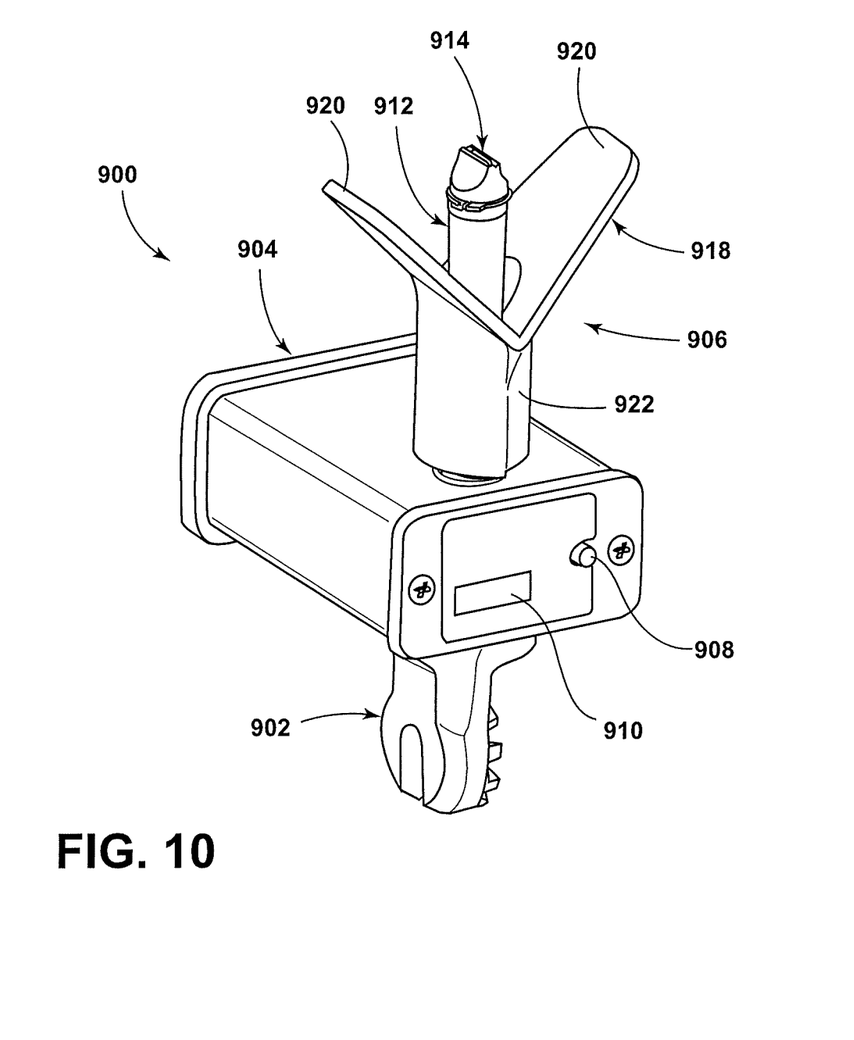
FIG. 10 shows a perspective view of the contacting temperature measuring device in an activated position.

FIGS. 9-10 show a contacting temperature measuring device 900 that contacts an item (e.g., an electric wire) to determine the temperature of the item. The contacting temperature measuring device 900 includes a pole connector 902 for connecting to universal head mount of a hot-stick (as discussed above), a housing 904 and a temperature sensing head 906. The housing 904 includes a transmitter for transmitting the temperature read by the temperature sensing head 906 to a receiver as outlined above. The housing 904 includes a power button 908 on a face thereof that will turn the transmitter when depressed (e.g., depressed one time). Depression of the power button 908 will cause a display 910 to show that the power is on (e.g., a red blinking light) and that the transmitter is transmitting and receiving a signal (normal mode). It is contemplated that the display 910 can show an error display (e.g., a solid red light) when the transmitter is on, but not communicating with the receiver. The transmitter of the housing 904 can be turned off by depressing the power button 908 (e.g., by holding the power button down for about a second). It is contemplated that the display 910 can provide a red light that flashes quickly, which will indicate that the power button 908 can be released to power down the transmitter. It is also contemplated that the transmitter can also power down if communication with the receiver is lost for more than a certain period of time (e.g., 8 minutes). The transmitter will also power down if the battery level becomes too low.

In the illustrated example, the temperature sensing head 906 is configured to contact an item to measure the temperature of the item. As illustrated in FIGS. 9 and 10, the temperature sensing head 906 includes a fixed post 912 extending from a surface of the housing 904, with the fixed post 912 having a contact temperature sensor 914 at an end thereof. A compression spring 916 surrounds the fixed post 912, is connected to the housing 904, and includes a sliding cover 918 connected to an end thereof opposite the housing 904. The sliding cover 918 is Y-shaped and includes a central tube 922 and pair of converging guides 920 extending from the central tube 920 in a V-shaped fashion. As illustrated in FIG. 9, the spring 916 biases the sliding cover 918 away from the housing 904 such that the central tube 922 covers the contact temperature sensor 914. To determine the temperature of an item, the item is positioned between the converging guides 920, thereby forcing the sliding cover 918 to overcome the bias of the spring 916 and move the sliding cover 918 toward the housing 904. As the sliding cover 918 moves toward the housing 904, the contact temperature sensor 914 is exposed to the item to be measured to allow the contact temperature sensor 914 to measure the temperature of the item.

The illustrated contacting temperature measuring device 900 is configured to remotely relay the temperature of the item being measured by the contacting temperature measuring device 900 to the remote receiver having all of the features and functioning like the unit 300 outlined above. Therefore, the contacting temperature measuring device 900 and the receiver connected thereto can perform all of the steps of the methods of FIGS. 6-8.

It is contemplated that both the contact sensor and the non-contact sensor as outlined above may be present in a single unit. In such a case, the display unit may display the temperature from the contact sensor, the non-contact sensor, or both the contact sensor and the non-contact sensor (either selectively or automatically).

Figure 11:
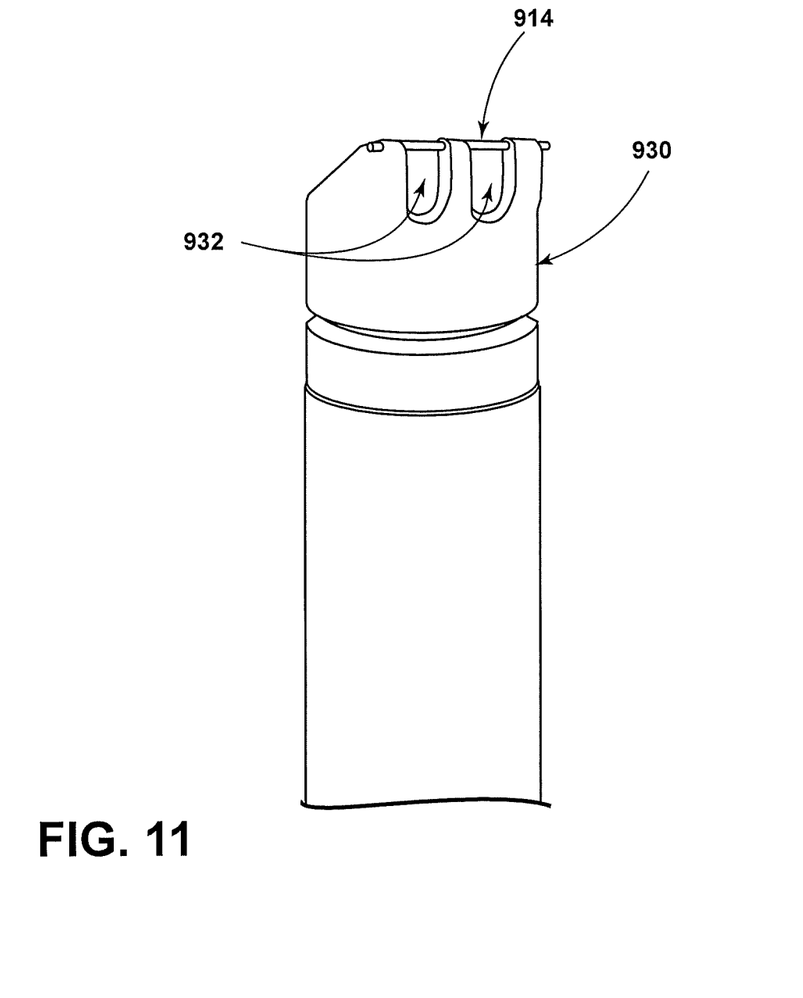
FIG. 11 shows a view of an end of a contact sensor.

If a contact sensor is used, a contact temperature sensor 914 may be mechanically supported by a sensor element support 930 (see FIG. 11). In some embodiments, the sensor element support 930 may comprise a material having a low thermal conductivity. In some embodiments, the sensor element support 930 may comprise one or more air gaps 932, forming a bridge-like configuration, wherein the one or more air gaps serve to reduce a thermal conductivity of the sensor element support.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A head unit comprising:
   a directional non-contact thermal sensor for acquiring thermal data from a surface within a field-of-view (FOV) of the non-contact thermal sensor;
   a direction pointing protrusion providing a visual aid for orienting the FOV towards a surface of interest;
   a wireless transmitter wirelessly transmitting the thermal data; and
   a mounting interface for mounting the head unit to another object;
   wherein the mounting interface comprises a universal hot-stick mount for attaching the head unit to a hot-stick.

2. The head unit of claim 1, further comprising battery monitoring circuitry for providing a battery level of the head unit, and wherein the wireless transmitter further transmits a value of the battery level.

3. The head unit of claim 1, wherein the direction pointing protrusion protrudes beyond an orientation plane of the non-contact thermal sensor by at least 2 inches.

4. The head unit of claim 1, wherein a tip of the direction pointing protrusion is located near an edge of the FOV of the non-contact thermal sensor.

5. The head unit of claim 1, wherein the directional non-contact thermal sensor has an approximately circular sensing FOV with a diameter that increases with distance from the sensor.

6. The head unit of claim 1, further comprising a momentary-contact power switch with an embedded device status visual indicator for indicating an operational status of the head unit.

7. The head unit of claim 1, further comprising automatic function disabling circuitry for disabling one or more components of the head unit when a battery level of the head unit is below a threshold value.

8. A head unit comprising:
   a directional non-contact thermal sensor for acquiring thermal data from a surface within a field-of-view (FOV) of the non-contact thermal sensor;
   a direction pointing protrusion providing a visual aid for orienting the FOV towards a surface of interest;
   a wireless transmitter wirelessly transmitting the thermal data; and
   a mounting interface for mounting the head unit to another object;
   a shielded enclosure to provide at least partial shielding from electric-power-line-frequency electric fields;
   wherein the shielded enclosure comprises a conductive enclosure with an opening for at least one of: the directional non-contact thermal sensor; an antenna for the wireless transmitter, wherein the antenna is proximal to the opening; and
   a battery compartment.

9. A temperature sensing system comprising:
   a head unit comprising a thermal sensor for acquiring thermal data from a surface, a wireless transmitter wirelessly transmitting the thermal data, and a mounting interface;
   wherein the head unit includes a sliding cover covering a contact sensor, the sliding cover being configured to slide between a cover position wherein the contact sensor is covered and a measurement position wherein the contact sensor is exposed to the surface for measuring a temperature of the surface, engagement with the surface causing the sliding cover to move from the cover position to the measurement position.

10. The temperature sensing system of claim 9, further comprising:
    a non-conductive pole connected to the mounting interface of the head unit.

11. The temperature sensing system of claim 9, wherein the thermal sensor comprises a directional non-contact thermal sensor for acquiring the thermal data from a surface within a field-of-view (FOV) of the non-contact thermal sensor; and the head unit further includes a direction pointing protrusion providing a visual aid for orienting the FOV towards a surface of interest.

12. The temperature sensing system of claim 9, wherein the thermal sensor comprises a contact sensor.

13. The temperature sensing system of claim 9, wherein the non-conductive pole is telescopically extendible.

14. A system comprising:
    a head unit comprising a thermal sensor and a wireless transmitter, said head unit acquiring thermal data with the thermal sensor and wirelessly transmitting the thermal data;
    wherein the head unit includes a sliding cover covering a contact sensor, the sliding cover being configured to slide between a cover position wherein the contact sensor is covered and a measurement position wherein the contact sensor is exposed to a surface for measuring a temperature of the surface, engagement with the surface causing the sliding cover to move from the cover position to the measurement position.

15. The system of claim 14, further comprising:
    a remote unit comprising a wireless receiver receiving the thermal data wirelessly transmitted from the head unit and a display, said remote unit displaying information related to the received thermal data.

16. The system of claim 14, wherein the thermal sensor comprises a directional non-contact thermal sensor for acquiring the thermal data from a surface within a field-of-view (FOV) of the non-contact thermal sensor; and the head unit further includes a direction pointing protrusion providing a visual aid for orienting the FOV towards a surface of interest.

17. The system of claim 14, wherein the thermal sensor comprises a contact sensor.

18. The system of claim 14, wherein the head unit further comprises a momentary-contact power switch with an embedded device status visual indicator for indicating an operational status of the head unit.

19. The system of claim 14, wherein the display of the remote unit further displays a battery level for the head unit based on a battery level value transmitted from the head unit to the remote unit.

20. The system of claim 14, wherein the display of the remote unit further displays a received signal quality for a wireless signal received by the remote unit from the head unit.

21. The system of claim 14, wherein the display of the remote unit further displays an error message if a received signal quality for a wireless signal received by the remote unit from the head unit is below a predetermined threshold value.

22. A method, comprising:
attaching a head unit comprising a non-contact thermal sensor and a wireless transmitter to a pole;
pointing the head unit towards ah object;
receiving thermal data transmitted wirelessly from the head unit to a remote unit, the remote unit being located near an operator, the remote unit having a wireless receiver for receiving the thermal data, the remote unit having a display;
displaying the thermal data on the display of the remote unit for the operator;
determining a battery level value for the remote unit;
receiving a head unit battery level value wirelessly from the head unit;
displaying battery level information for the head unit based on the head unit battery level value;
displaying the battery level information for the remote unit based on a remote unit battery level value; and
indicating an error condition if at least one of the head unit and remote unit battery level values is below a threshold value.

23. The method of claim 22, further including:
obtaining battery level data for one or more batteries powering the head unit; and
transmitting the battery level data with the wireless transmitter.

24. The method of claim 23, wherein the obtaining and transmitting are automatically repeated periodically over time.

25. The method of claim 23, further comprising:
determining an operational state of the head unit; and
displaying the determined operational state with a visual indicator on the head unit.

26. The method of claim 25, wherein the operational state is at least one of: powered on but not paired with a receiver, powered on and paired with a receiver, transitioning to a powered off state, and powered off.

27. The method of claim 23, further comprising automatically disabling one or more components of the head unit when a battery level of the head unit is below a threshold value.

28. The method of claim 22, wherein a step of indicating the error condition comprises at least one of: ceasing display of the thermal information; displaying a warning message; and ceasing display of any information.

29. The method of claim 22, further comprising displaying a warning message when a wireless connection between the head unit and the remote unit is lost.

30. The method of claim 22, further comprising displaying received signal quality information for wireless signals received from the head unit.

31. The method of claim 22, further comprising displaying an error message if a received signal quality for a wireless signal received by the remote unit is below a predetermined threshold value.

32. The method of claim 22, wherein the method is automatically repeated periodically over time.

* * * * *

UNITED STATES PATENT AND TRADEMARK OFFICE
CERTIFICATE OF CORRECTION

PATENT NO.        : 10,502,634 B2
APPLICATION NO.   : 15/584511
DATED             : December 10, 2019
INVENTOR(S)       : Kevin Lynn Baum et al.

Page 1 of 1

It is certified that error appears in the above-identified patent and that said Letters Patent is hereby corrected as shown below:

In the Claims

Claim 22: Column 11, Line 26; change "pointing the head unit towards ah object;" to ---pointing the head unit towards an object;---

Signed and Sealed this
Eleventh Day of February, 2020

Andrei Iancu
*Director of the United States Patent and Trademark Office*